INVENTOR
Gerhard M. Stein &
Dean A. Yannucci.
BY Donald R. Lackey
ATTORNEY

Feb. 3, 1970

G. M. STEIN ET AL 3,493,907

ELECTRICAL WINDING STRUCTURES

Filed March 28, 1968

United States Patent Office
3,493,907
Patented Feb. 3, 1970

3,493,907
ELECTRICAL WINDING STRUCTURES
Gerhard M. Stein, Sharon, Pa., and Dean A. Yannucci, Niles, Ohio, assignors to Westinghouse Electric Corporation, Pittsburgh, Pa., a corporation of Pennsylvania
Filed Mar. 28, 1968, Ser. No. 716,888
Int. Cl. H01f 15/14
U.S. Cl. 336—70   8 Claims

ABSTRACT OF THE DISCLOSURE

A high series capacitance winding of the interleaved turn type, for electrical inductive apparatus. The winding includes a plurality of pancake coils disposed in spaced side-by-side relation, each formed of first and second conductors spirally wound together to provide first and second radially interleaved sections, respectively, each having inner and outer ends. The two radial sections are interconnected in each pancake coil, with the outer end of the first radial section being connected to the inner end of the second radial section in alternate pancake coils, and the outer end of the second radial section being connected to the inner end of the first radial section in the remaining pancake coils. Adjacent pancake coils are then connected with finish-start connections between the unconnected outer end of a radial section in each pancake coil to the unconnected inner end of a radial section in the next adjacent pancake coil, to connect the plurality of pancake coils in series circuit relation and provide a single series path through the winding.

BACKGROUND OF THE INVENTION

Field of the invention

The invention relates in general to high series capacitance windings for electrical inductive apparatus, such as transformers, and more particularly to high series capacitance windings of the interleaved turn type.

Description of the prior art

United States Patent No. 3,090,022, issued May 14, 1963 to G. M. Stein, which is assigned to the same assignee as the present application, discloses singly interleaved high series capacitance windings for transformers and reactors of the core-form type. The winding includes a plurality of pancake coils disposed in spaced, side-by-side relation, each having two radially interleaved sections formed by spirally winding two conductors together. Adjacent pancake coils are connected with successive start-start, finish-finish connections, between predetermined radial sections thereof, to connect the pancake coils in series and provide a single series path through the winding. The term "singly interleaved" means that there is one basic interleaving arrangement per pancake coil. Further, the "start" of a pancake coil is located at the inner end of one of its radial sections, and the "finish" of a coil is at the outer end of one of its radial sections, regardless of where the electrical circuit first enters the pancake coil. Thus, a "start-start" interpancake connection is one made between the inner edges of two adjacent pancake coils, and a "finish-finish" connection is one made between the outer edges of two adjacent pancake coils.

With start-start, finish-finish connected pancake coils, the electrical circuit through the winding spirals inwardly in alternate pancake coils, and outwardly in the remaining pancake coils. Thus, the direction of the conductor turns must be reversed from coil to coil in order for the magnetomotive force produced in the magnetic core associated with the coils to be additive. In order to keep the interpancake connections as short as possible, and to keep the number of brazed joints per pancake to a minimum, it is the practice of the prior art to machine wind the pancake coils in which the electrical coils spiral outwardly. The pancake coils in which the electrical circuit spirals inwardly are first machine wound, using the unsevered conductor from the finish of one of the interleaved sections in the preceding pancake coil, in order to gather the correct amount of conductor for the coil, and to provide a short unsevered interpancake connection, and then the machine wound coil is broken down and rewound by hand, such that the turns spiral in the opposite direction from the machine wound coils. Thus, in constructing the winding, after each pancake coil is wound in which the electrical circuit spirals outwardly, a machine wound-hand wound coil is made. The manufacturing time required to construct this winding is substantially longer than a winding having all machine wound pancake coils, which increases its manufacturing cost accordingly.

Interconnecting the singly interleaved pancake coils disclosed in the hereinbefore mentioned U.S. patent with finish-start connections, instead of start-start, finish-finish connections, would enable all machine wound pancake coils to be used, as the electrical circuit would spiral outwardly in each of the pancake coils. Windings having all finish-start connected pancake coils also have the advantages of reducing the steady-state interpancake stress by approximately 25 percent compared with start-start, finish-finish connected coils and the finish-start connected pancake coils have greater mechanical strength under short circuit stresses than start-start, finish-finish pancake coils. Attempts to accomplish this, however, have been fraught with mechanical or electrical problems, or both, which have heretofore made this type of winding generally unsuitable.

SUMMARY OF THE INVENTION

Briefly, the present invention is a new and improved high series capacitance winding which includes a plurality of finish-start connected, singly interleaved pancake coils, each having first and second radially interleaved sections formed by spirally winding first and second conductors together. Since with finish-start connected pancake coils the electrical circuit spirals outwardly in each pancake coil, all of the pancake coils may be machine wound. The prior art disadvantages of this general type of winding structure have been overcome by making two important changes, the first of which requires alternating the sequence in which the electrical circuit proceeds through the two radially interleaved sections of each pancake coil, from pancake coil to pancake coil. If the circuit proceeds successively through the first and second radial sections of one pancake coil, it will then proceed to the next pancake coil via a finish-start connection and proceed successively through the second and first radial sections of that pancake coil. This arrangement has been found to substantially reduce the high voltages which may occur between the midpoint of the coil build and the interleaving and interpancake connections, when a surge potential is applied to the winding. This change, while solving the electrical high voltage surge problems, introduces mechancial problems in attempting to maintain a compact winding structure having a minimum build dimension, and electrical problems in insulating the finish-start and interleaving connections where they enter the conductor turns of the coils. The second change solves these problems, requiring that the relative circumferential locations of the finish-start connection and the interleaving connection be reversed between each successively adjacent pair of like pancake coils. This causes each of these connections to enter conductor turns at the extreme inner and outer edges of the coil, thus facilitating the insulating of these connections, and the making of any necessary brazed joints.

BRIEF DESCRIPTION OF THE DRAWING

Further advantages and uses of the invention will become more apparent when considered in view of the following detailed description and drawings, in which.

DESCRIPTION OF THE PREFERRED EMBODIMENTS

Figure 1:
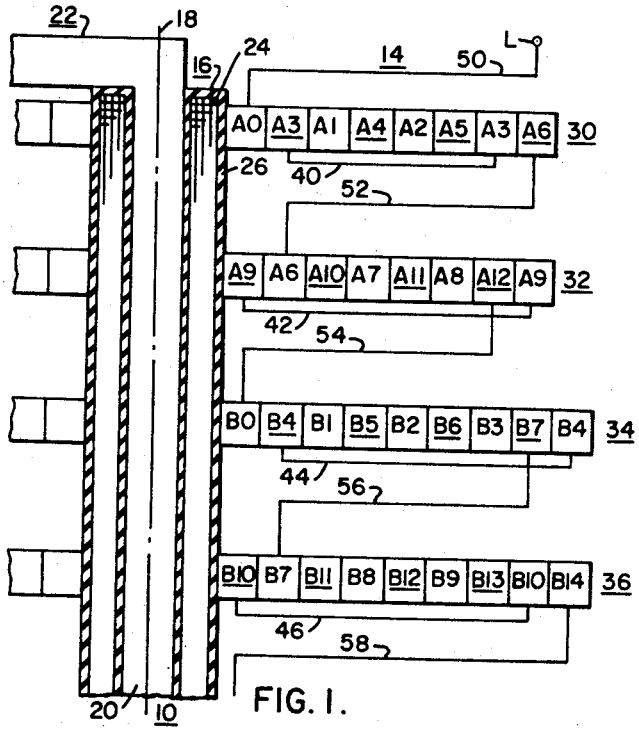
FIG. 1 is a partial sectional elevation of a winding structure embodying the teachings of the invention.

Referring now to the drawings, and FIG. 1 in particular, there is shown a fragmentary, elevational view of a transformer 10, of the core-form type, constructed according to the teachings of the invention. Transformer 10 may be single or polyphase, and since each phase would be similar, only one phase is shown in FIG. 1. Specifically, transformer 10 includes high and low voltage winding assemblies 14 and 16, respectively, concentrically wound about an axis 18, and disposed on a leg 20 of a suitable magnetic core structure 22. Low voltage winding 16 includes a plurality of insulated conductor turns 24, and is insulated from the magnetic core 22 and high voltage winding 14 by insulating means 26.

High voltage winding 14 includes a plurality of pancake or disc type coils 30, 32, 34 and 36, disposed in spaced, side-by-side relation with their windows or coil openings in alignment, encircling the low voltage winding 16 and the leg 20 of magnetic core structure 22. High voltage winding 14 may have any desired number of pancake coils, and the pancake coils may have any desired number of conductor turns, as dictated by a specific application.

Pancake coils 30 and 32 have an even number of conductor turns, and pancake coils 34 and 36 have an odd number of conductor turns, in order to illustrate the teachings of the invention as applied to both types of coil constructions. It is to be understood, however, that all of the pancake coils in high voltage winding 14 may have an even number of conductor turns, they all may have an odd number of conductor turns, or, as shown, the winding may include pancake coils having even and odd numbers of conductor turns.

Figure 2:
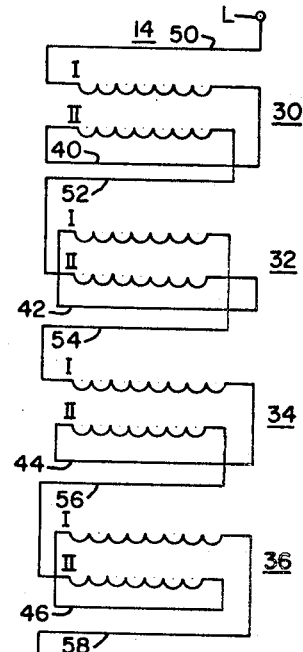
FIG. 2 is a schematic diagram of the winding structure shown in FIG. 1.

More specifically, as shown in FIG. 1, and more clearly in the schematic diagram of high voltage winding 14 in FIG. 2, each of the pancake coils of high voltage winding 14 have two radially interleaved sections I and II, formed by spirally winding two radially disposed conductors together about a mandrel. Thus, each radial section has an inner end, located at the start or inner edge of the coil, and each has an outer end located at the finish or outer periphery of the coil. Each of the pancake coils 30, 32, 34 and 36 are singly interleaved by connecting the outer end of one of the radial sections to the inner end of the other radial section, via interleaving connections 40, 42, 44 and 46, respectively. Once it is decided which radial section, in the line end pancake coil 30, is to have its outer end connected to the inner end of the other radial section, the sequence is reversed from pancake coil to pancake coil across the winding. In other words, as shown in FIGS. 1 and 2, the outer end of radial section I is connected to the inner end of radial section II via interleaving connection 40. Thus, in the next adjacent pancake coil 32, the interleaving connection 42 must connect the outer end of radial section II to the inner end of radial section I. This method of making the interleaving connections in pancake coils 30 and 32 is then repeated for each subsequent pair of pancake coils across the winding. This leaves each pancake coil with a radial section having an unconnected inner end, and the other radial section with an unconnected outer end. The unconnected outer and inner ends of adjacent pancake coils are then interconnected with finish-start interpancake connections. The unconnected inner end of the radial section in the line end pancake coil is connected to the line terminal L, and the unconnected outer end of the radial section in the pancake coil at the other end of the winding is connected to ground, or to another line terminal, depending upon the specific application. Thus, the inner end of radial section I of pancake coil 30 is connected to the line terminal L via conductor 50, the outer end of radial section II of pancake coil 30 is connected to the inner end of radial section II of pancake coil 32 via finish-start connection 52, the outer end of radial section I of pancake coil 32 is connected to the inner end of radial section I of pancake coil 34, via finish-start connection 54, the outer end of radial section II of pancake coil 34 is connected to the inner end of radial section II of pancake coil 36 via finish-start connection 56, and the other end of radial section I of pancake coil 36 is connected to the inner end of radial section I of the next adjacent pancake coil (not shown) via finish-start connection 58. If pancake coil 36 is the last pancake coil of the winding 14, conductor 58 would be connected to ground, or to another line terminal, as hereinbefore explained. Thus, all of the pancake coils are serially connected, providing a single series circuit between the ends of the winding, and with the series circuit traversing each coil twice, through its two radial sections. Since the circuit spirals outwardly in each pancake coil, through each radial section, all of the coils may be machine wound.

By reversing the sequence of interconnecting the radial sections in each pancake coil, the interpancake finish-start connections connect like radial sections of adjacent pancake coils, to perform what will be called an "interchange," with the circuit traversing the radial sections in the sequence of I–II in one pancake coil, and reversing the sequence in the next pancake coil, to traverse the radial sections of that coil in the sequence II–I. This arrangement has been found to be essential in singly interleaved finish-start connected pancake coils. When the radial sections of each pancake coil are connected in the same manner, and the interpancake connections connect unlike radial sections, the circuit traverses the radial section of each pancake coil in the same sequence. When the pancake coils are so connected, surge voltages applied to the line terminal, such as by lightning or switching transients, causes a large transient voltage build-up towards the midpoint of the build in the pancake coils, which may cause an insulation failure between these turns and the interleaving connection, or between these turns and the finish-start connection. Adding additional insulation at these points is undesirable, as it extends the axial length of the high voltage winding which requires a larger magnetic core, a larger tank for holding the core-winding assembly, and thus more liquid dielectric, which adversely affects the size, cost, weight and efficiency of the transformer. It is also undesirable, as it increases the width of the duct between pancake coils, which increases the ground capacitance per section of the winding, defeating the very purpose of interleaving the turns of different radial sections in the pancake coils.

Connecting the pancake coils to perform this interchange, wherein the circuit first enters one radial section in one pancake coil, and first enters the other radial section in the next adjacent pancake coil, reduces the voltage stress between the midpoint turns of the pancake coils, and the top-to-bottom interleaving and interpancake connections, by a third, or more, during surge potentials, thus allowing normal insulating clearances to be used between these top-to-bottom connections and the conductor turns of the pancake coil.

This interchange is clearly illustrated in FIG. 1 by following the circuit through the pancake coils. Each of the conductor turns of pancake coils 30 and 32 are given the letter A, followed by a number which indicates the number of turns from the line end of the winding, and the second time the circuit spirals through the radial build of the coil, the letter and number combination has a line drawn beneath it. Thus, the circuit enters the inner end of radial section I of pancake coil 30, which is the end of its innermost turn, and it is referenced A0. The circuit spirals outwardly, appearing at every other turn, referenced A1, A2 and A3. At the end of turn A3, which is the next to the outermost turn, the circuit is brought back to the start of section II via interleaving connection 40, and it again spirals outwardly appearing at alternate turns referenced A4, A5 and A6. The circuit continues to pancake coil 32 via finish-start connection 52, and enters the inner end of radial section II, which is the next to the innermost turn, and the circuit spirals outwardy, appearing at every other turn referenced A7, A8 and A9. At the end of turn A9, which is the outermost turn, the circuit is returned to the inner end of radial section I of pancake coil 32 via interleaving connection 42, which is the innermost turn, and the circuit again spirals outwardly, appearing at alternate turns A10, A11 and A12.

Pancake coils 34 and 36 have their conductor turns labeled with the letter B, followed by a number which indicates the number of turns from the start of pancake coil 34, and the second time the circuit spirals through these pancake coils the letter and number combination has a line drawn beneath it. The letter B is used for these odd numbered turn pancake coils, to distinguish them from the even numbered turn pancake coils 30 and 32.

Thus, the circuit enters the inner end of radial section I of pancake coil 34, which is the end of its innermost turn, and it is referenced B0. The circuit spirals outwardly, appearing at every other turn, references B1, B2, B3 and B4. At the end of turn B4, which is the outermost turn, since radial section I has one more turn than radial section II, the circuit is brought back to the start of section II via interleaving connection 44, and it again spirals outwardly appearing at alternate turns referenced B4, B5, B6 and B7. The circuit continues to pancake coil 36 via finish-start connection 56, and enters the inner end of radial section II, which is the next to the innermost turn, and the circuit spirals outwardly, appearing at every other turn referenced B8, B9 and B10. At the end of turn B10, which is the next to the outermost turn, the circuit is returned to the inner end of radial section I of pancake coil 36 via interleaving connection 46, which is the innermost turn, and the circuit again spirals outwardly, appearing at alternate turns B11, B12, B13, and B14.

In constructing the pancake coils, 30, 32, 34 and 36, it is essential that all interleaving and interpancake connections be kept in the open at the inner and outer edges of the pancake coils. In other words, the interleaving connection should be connected to turns which are at the inner and outer edges of the coil, with the outermost and innermost turns being terminated via their connections, prior to the terminating of the next to the outermost and the next to the innermost turns via their connections, in order to accomplish this arrangement. If the outermost turn were to proceed past the termination of the next to the outermost turn, or if the innermost turn were to proceed past the termination of the next to the innermost turn, insulating problems would be created, as well as discontinuities in the interleaving effect, which may cause oscillatory voltages of high magnitude to be created when surge potentials are applied to the winding.

The interleaving and interpancake connections are kept in the open, at the inner and outer edges of the pancake coils, by circumferentially spacing these top-to-bottom connections from one another, and by reversing their relative circumferential positions from pancake coil to pancake coil, between all pancakes having an even number of turns, and between all pancakes having an odd number of turns. If pancake coils having both even and odd numbers of turns are used in the same winding structure, these connections are reversed between like pancake coils, but they may not necessarily be reversed between unlike pancake coils. However, in any event, all top-to-bottom connections will be in the open at the inner and outer edges of the pancake coils, and an interchange will be made from pancake coil to pancake coil across the winding.

Figure 4:
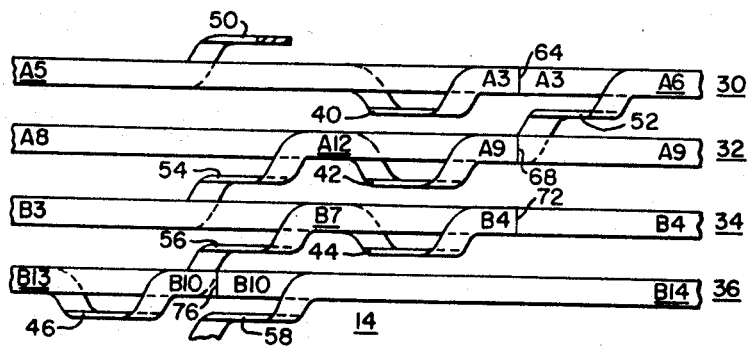
FIG. 4 is a diagram illustrating the interleaving and interpancake connections of the pancake coils shown in FIG. 3, viewed from the outside edges of the pancake coils.
Figure 3:
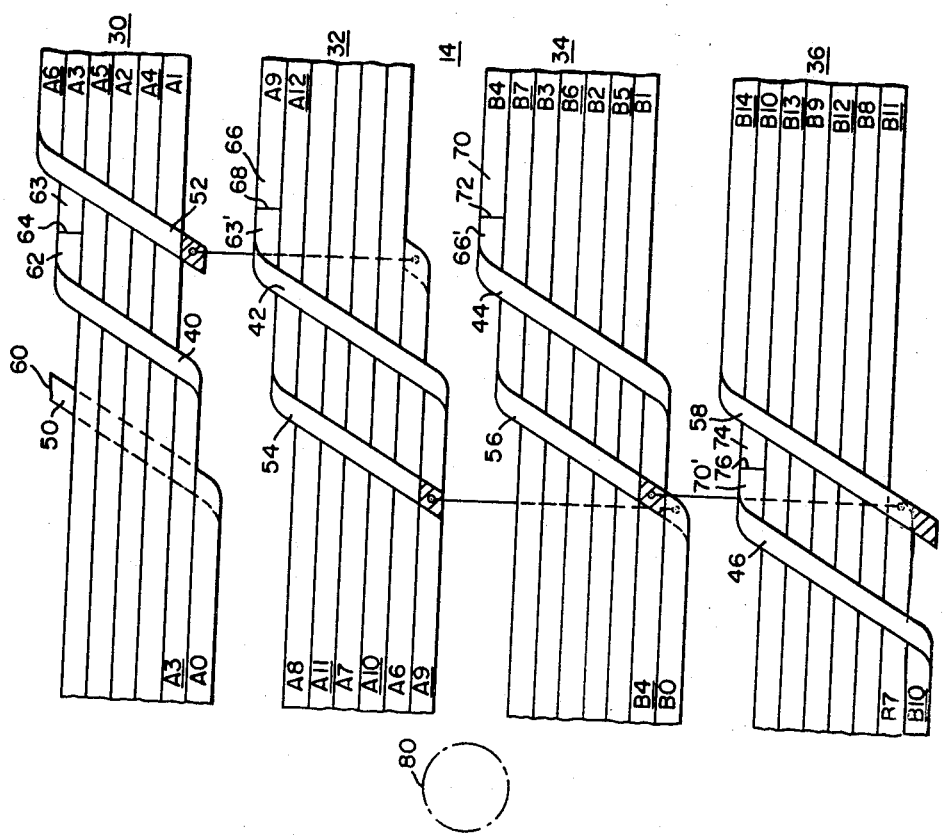
FIG. 3 illustrates fragmentary side views of pancake coils constructed and interconnected according to an embodiment of the invention.

This arrangement is shown in FIGS. 3 and 4, which illustrate fragmentary side views and outer edge views, respectively, of the pancake coils 30, 32, 34 and 36, of winding 14 shown in FIGS. 1 and 2, with the embodiment of the invention shown in FIGS. 3 and 4 requiring only one brazed joint per pancake coil. In this embodiment, the conductors used to wind the pancake coils are also used to make the interleaving and interpancake connections.

Specifically, pancake coil 30 is wound from two conductors which start at ends 60 and 62, making the interleaving connection 40 and conductor 50, before being spirally wound together to form radial sections I and II, respectively. After the build of pancake coil 30 is completed, the conductor which formed the radial section I is severed to form end 63, which is brazed to the end 62 of radial section II, to form brazed joint 64. The other end of this severed conductor, referenced 63', is used to start radial section I of pancake coil 32, after first forming interleaving connection 42. After pancake coil 30 is wound, the conductor which formed radial section II is continued, unsevered, to start radial section II of pancake coil 32, thus automatically forming the interpancake connection 52. After pancake coil 32 has been wound, the conductor which formed radial section II is severed to provide end 66, which is brazed to end 63' of radial section I, to form brazed joint 68. The conductor which formed radial section I of pancake coil 32 is continued unsevered to start radial section I of pancake coil 34, automatically forming the finish-start interpancake connection 54. The other end of the severed conductor from pancake coil 32, referenced 66' is used to make interleaving connection 44, and it is then wound with the continuation of the conductor from radial section I of pancake coil 32. The conductor which forms radial section I of pancake coil 34 is severed to provide end 70, which is brazed to end 66' of radial section II, to form brazed joint 72. The other end of this severed conductor, referenced 70', is used to form radial section I of pancake coil 36, after first forming interleaving connection 46, and the conductor which formed radial section II of pancake coil 34 is continued unbroken to start radial section II of pancake coil 36. The conductor which forms radial section II of pancake coil 36 is then severed to provide end 74, which is brazed to end 70' of radial section I, to provide brazed joint 76. This sequence is continued from pancake coil to pancake coil across the winding 14.

It will be noted that the interleaving and interpancake connections are at the extreme inside and outside edges of each pancake coil and this is accomplished by reversing the circumferential locations of the spaced connections between like pancake coils. For example, if the circle 80 represents the position of the winding machine operator while winding the coils, the interleaving connection 40 is closer to the operator 80 than the interpancake connection 52 in pancake coil 30, while in the next adjacent pancake coil 32, the interpancake connection 54 is closer to the operator 80 than the interleaving connection 42. If winding 14 contained only pancake coils having an even number of turns, i.e., each radial section having a like number of turns, the relative circumferential locations of these connections will be reversed from coil to coil across the complete winding. Further, as between like pancake coils 34 and 36, which have an odd number of turns, i.e., the radial section starting the innermost turn has one more turn than the other radial section, the relative circumferential locations of these circumferentially spaced top-to-bottom connections will also be reversed from pancake to pancake coil, with the interpancake connection 56 being closer to the operator 80 than the interleaving connection 44 in pancake coil 34, and with the interleaving connection 46 being closer to the operator than the interpancake connection 58 in pancake coil 36.

However, between unlike pancake coils, i.e., between two pancake coils having an odd and even number of turns, such as between pancake coils 32 and 34, the interpancake connections are not reversed. This is due to the fact that when the circuit first enters radial section I of a pancake coil having an even number of turns, the interleaving connection lies closer to the operator than the interpancake connection, while when the circuit first enters radial section I of a pancake coil having an odd number of turns, the interpancake connection lies closer to the operator than the interleaving connection.

It will be noted that no conductor passes radially over, or radially under, the termination of another conductor, which simplifies the insulating of these connections where they enter the conductor turns, it preserves the interleaving effect, precluding the possibility of having two conductors from the same section spaced radially by a gap, and it keeps the connections to be brazed accessible at the edges of the pancake coils.

Figure 6:
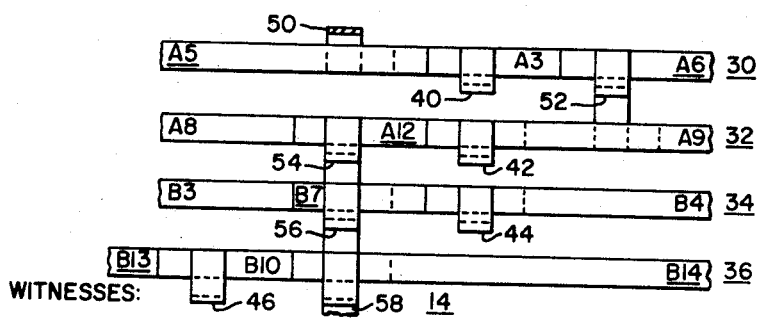
FIG. 6 is a diagram illustrating the interleaving and interpancake connections of the pancake coils shown in FIG. 5, viewed from the outside edges of the pancake coils.
Figure 5:
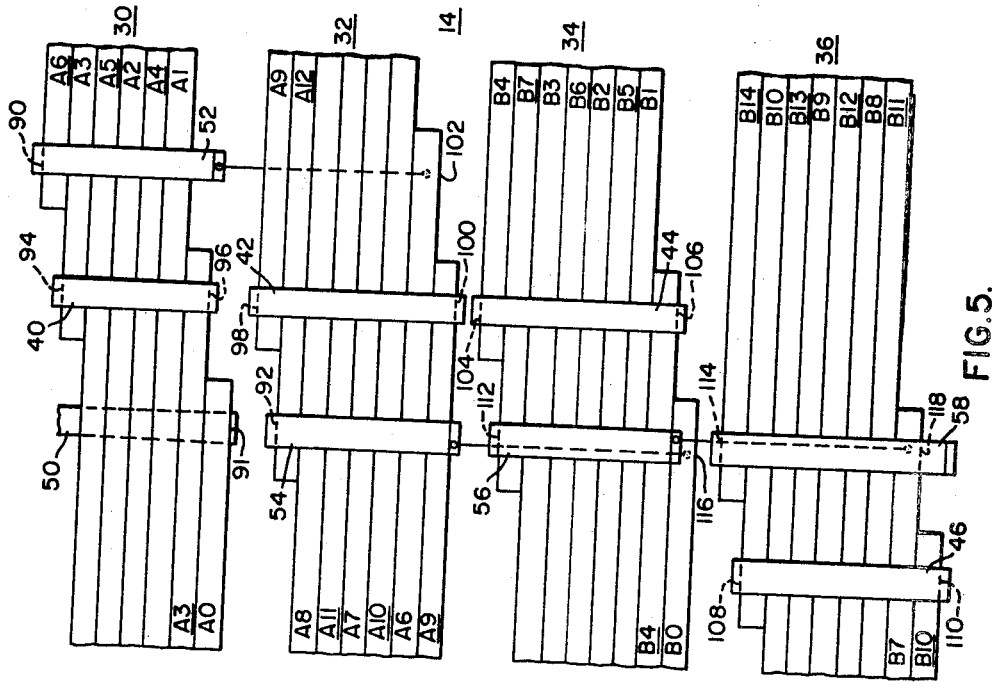
FIG. 5 illustrates fragmentary side views of pancake coils constructed and interconnected according to another embodiment of the invention.

Instead of using the conductor from the pancake coils to make the top-to-bottom interleaving and interpancake connections, they also may be made by preformed U and Z shaped conductors, respectively. This embodiment of the invention is shown in FIGS. 5 and 6, which are fragmentary side views and outer edge views, respectively, of pancake coils 30, 32, 34 and 36. Only two sizes of U-shaped connectors and one size of Z-shaped connector is required for any number of similar pancake coils having an even number of turns, and only one size of U-shaped connector and two sizes of the Z-shaped connector are required for any number of similar pancake coils having an odd number of turns. Four brazed joints will be required per pancake coil, but since all brazed joints are made to conductor turns located at the inner and outer periphery of the coils, they may be made quickly and efficiently. Further, the insulating of the turns and top-to-bottom connections is simplified, since the conductor turns do not have to be bent to form the top-to-bottom connections. Bends require a small amount of additional insulation to be inserted in order to prevent rubbing contact between the bend and the immediately adjacent conductor turn. Separate pre-bent connectors may be insulated with pre-formed insulating members, reducing the amount of time required to place the insulation, and providing a more uniformly insulated winding structure.

More specifically, in like pancake coils 30 and 32, interpancake connectors 52 and 54 may have a Z-shape, and they may be of the same size, with connector 52 being brazed to turn A6 of pancake coil 30 at 90, and connector 54 being brazed to turn A12 at 92. Interleaving connections 40 and 42 are U-shaped connectors of different sizes, with connector 40 being brazed to turns A3 and A3 at 94 and 96, respectively, in pancake coil 30, and connector 42 being brazed to turns A9 and A9 at 98 and 100, respectively, in pancake coil 32. Connector 50 would be brazed to turn A0 at 91 in pancake coil 30, and connector 52 would be brazed to turn A6 of pancake coil 32 at 102.

In like pancake coils 34 and 36, the interleaving connections 44 and 46 may have a U-shape and may be of the same size, with connector 44 being brazed to turns B4 and B4 at 104 and 106, respectively, and interleaving connection 46 being brazed to turns B10 and B10 at 108 and 110, respectively. The interpancake connections 56 and 58 are Z-shaped connections of different sizes, with connector 56 being brazed to turn B7 at 112, and connector 58 being brazed to turn B14 at 114. Connector 54 will be brazed to turn B0 in pancake coil 34 at 116, and connector 56 will be brazed to turn B7 at 118 in pancake coil 36.

In summary, there has been disclosed a new and improved high series capacitance winding of the interleaved turn type, for electrical inductive apparatus, such as transformers and reactors. The disclosed winding has a plurality of singly interleaved pancake coils, the turns of which are spiraled in the same direction, and which are interconnected with finish-start connections, to provide a winding having a single series path therethrough. Since the turns of all of the pancake coils spiral outwardly in the same direction, all of the pancake coils may be machine wound, eliminating the machine-hand winding steps for alternate coils of prior art windings using singly interleaved pancake coils. Further, the disclosed winding structure substantially reduces the magnitude of transient voltages which may be developed between the mid-turns of the pancake coils and the top-to-bottom connections of the coils, which would be present when a surge potential is applied to the winding, if the coils were to all be constructed identically and interconnected identically. Still further, the disclosed construction places all of the connections between the conductor turns and the top-to-bottom connections at the extreme outer and inner edges of the coils, facilitating the insulating of these connections, facilitating any brazed connections required, and eliminating discontinuities in the high series capacitance effect.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:
1. An interleaved turn high series capacitance winding for electrical inductive apparatus, comprising:
  a plurality of pancake coils disposed in spaced, side-by-side relation,
  each of said pancake coils having a plurality of turns of at least first and second conductors spirally wound together, to provide first and second radially interleaved sections, respectively, each having inner and outer ends,
  interleaving connection means interconnecting opposite ends of the first and second radial sections in each pancake coil, with the outer end of the first radial section being connected to the inner end of the second radial section in alternate pancake coils, and the outer end of the second radial section being connected to the inner end of the first radial section in the remaining pancake coils,
  and interpancake connection means interconnecting the unconnected outer end of a radial section in each pancake coil to the unconnected inner end of a radial section in the next adjacent pancake coil, to connect said plurality of pancake coils in series circuit relation with finish-start connections, and provide a single series circuit through the winding.

2. The winding of claim 1 wherein the turns in each of said plurality of pancake coils are wound in the same direction.

3. The winding of claim 1 wherein the first and second radial sections have a like number of turns in each of said pancake coils.

4. The winding of claim 1 wherein one of the radial sections has one more turn than the other of the radial sections in each pancake coil.

5. The winding of claim 1 wherein the first and second radial sections have a like number of turns in certain of the pancake coils, and one of the radial sections has one more turn than the other radial section in the remaining pancake coils.

6. The winding of claim 1 wherein said interpancake connection means is the unsevered continuation of the conductor which formed the radial section which has its outer end connected to the inner end of a radial section in the next adjacent pancake coil.

7. The winding of claim 1 wherein said interleaving and interpancake connection means are pre-formed U and Z-shaped electrical conductors, respectively.

8. The winding of claim 1 in which the interleaving and interpancake connection means are circumferentially spaced, with the relative circumferential locations of the interleaving connections and interpancake connections being reversed between each adjacent pair of similar pancake coils, to place these connections at the outer and inner edges of said pancake coils.

References Cited

UNITED STATES PATENTS

| | | | |
|---|---|---|---|
| 3,090,022 | 5/1963 | Stein | 336—70 |
| 3,246,270 | 4/1966 | Stein | 336—70 |
| 3,278,879 | 10/1966 | Stein | 336—187 |
| 3,419,835 | 12/1968 | Stein | 336—187 |

LEWIS H. MYERS, Primary Examiner

T. J. KOZMA, Assistant Examiner